March 1, 1938.    J. P. KRIECHBAUM    2,109,862
TEMPERATURE CONTROL SYSTEM
Filed May 5, 1934
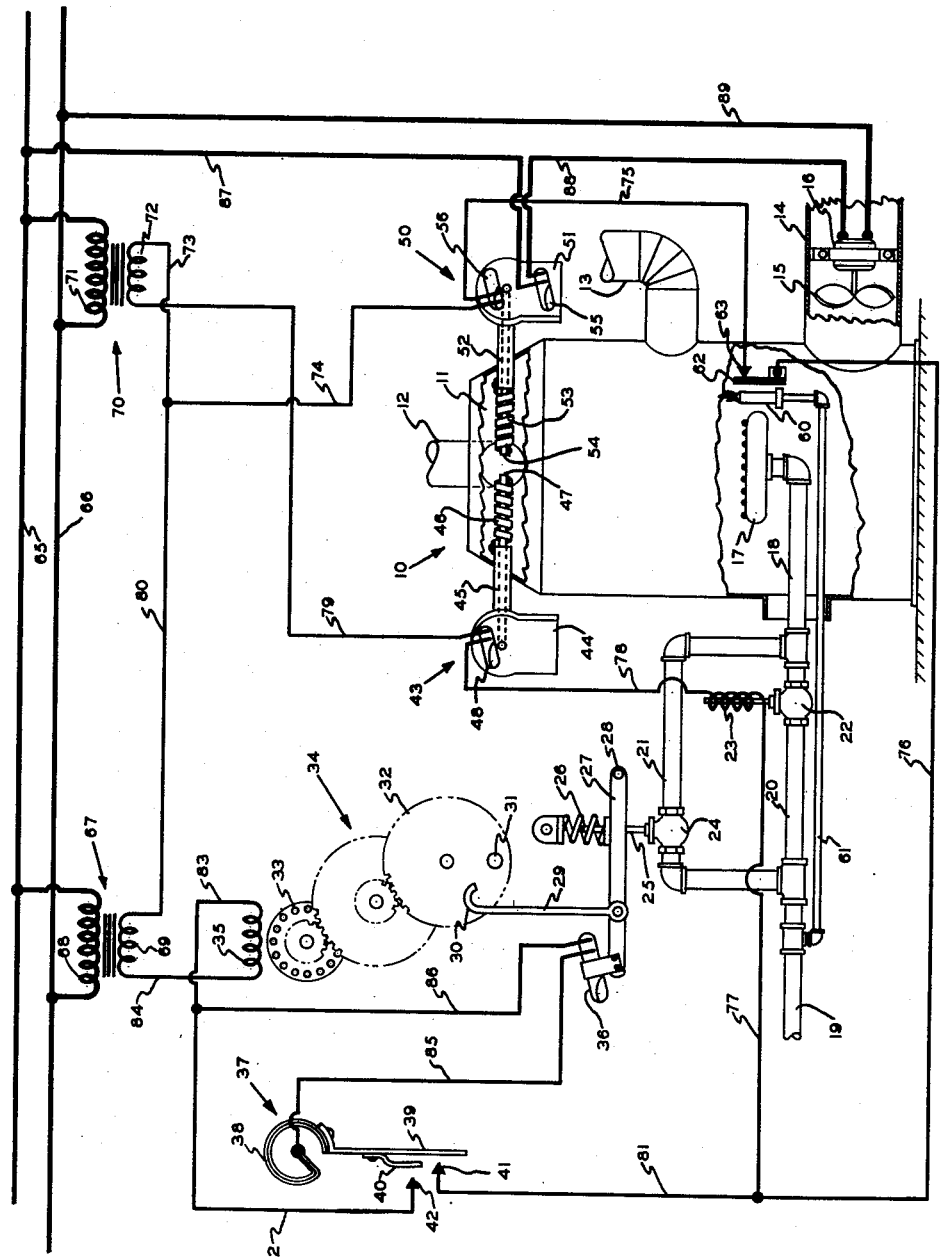
Inventor.
JOHN P. KRIECHBAUM
By George H Fisher
Attorney Patented Mar. 1, 1938

2,109,862

UNITED STATES PATENT OFFICE 2,109,862

TEMPERATURE CONTROL SYSTEM

John P. Kriechbaum, Minneapolis, Minn., assignor to Minneapolis-Honeywell Regulator Company, Minneapolis, Minn., a corporation of Delaware Application May 5, 1934, Serial No. 724,148

11 Claims. (Cl. 236—9)

The present invention relates to the automatic control of a condition or force, such as temperature, and the primary object of the invention is the provision of an automatic control system by which the value of the condition or force may be maintained more nearly that desired and by which the response of a condition or force changing device may be hastened.

One of the objects of the present invention is the provision of an automatic control system for a fluid actuated temperature changer wherein valve means in control of the flow of actuating fluid to the temperature changer are operated to supply actuating fluid thereto at two different rates or in two different quantities in response to changes in two different conditions whereby stratification of air in the space to be controlled is eliminated and whereby the response of the temperature changer is hastened. Preferably, one of these conditions is controlled by the temperature changer, such as the room or space temperature, whereas the other condition is more directly responsive to the temperature changer, such as the actual temperature condition of the temperature changer.

A further object of the invention is the provision of a heating system in which the flow of fuel to a heater is controlled by valve means which are operated to allow two different rates or quantities of fuel flow to the heater in response to changes in two different conditions. Here again, the two conditions are preferably the room or space temperature and some heater condition such as the temperature of the heater itself.

In the preferred embodiment of the invention, the valve means comprises a pair of valves, each one of which is controlled by one of the conditions. In other words, one of the valves is controlled by room or space temperature and the other of the valves is controlled by the heater condition. Also, to obtain the most satisfactory results, these valves are of different capacities, one being a high capacity valve and the other a low capacity valve. The low capacity valve is preferably controlled by the changes in the heater condition, whereas the high capacity valve is preferably controlled by the changes in room or space temperature.

In the preferred form of the invention, the heater or temperature changer changes the heat content of a circulating fluid medium which is utilized to maintain the room or space temperature at or above the desired point. Associated with the heater is a circulation control means or circulator by means of which the circulation of this fluid medium is controlled. Preferably, the circulator is such that when it is not operating, gravity circulation is allowed and when the circulator is operative, it operates to increase the rate of circulation of the fluid medium.

A further object of the invention is the provision of a temperature changing system in which the temperature changer is operated at one rate or capacity in order to maintain the space or room temperature at the desired value and is operated at another rate or capacity, preferably smaller, in accordance with the output of the temperature changer, so as to maintain said output at or above a predetermined minimum when the space or room temperature is at the desired value. Preferably, the circulation controlling means is controlled in accordance with the output of the temperature changer and is so arranged as to be inoperative when the output of the temperature changer is relatively low by reason of the room or space temperature being at the desired value and is rendered operative when the temperature changer is operated at a higher output in response to a device in the space or room temperature which responds to a departure of the space or room temperature from the desired value.

Another object of the invention is the provision of a temperature control system made up of devices readily available on the open market.

Further objects of the invention will be found in the following detailed description, the accompanying single drawing and the appended claims.

For a more complete understanding of the invention, reference may be had to the following detailed description and the accompanying single drawing which is a diagrammatic showing of one form of the present invention.

Referring to this single drawing, a force or condition changing device, generally indicated at 10, is herein shown as comprising the usual warm air furnace having a warm air chamber or bonnet 11 from which the warm air is conducted to the rooms or space to be heated by suitable headers 12. The warm air furnace 10 is also provided with the usual stack pipe 13. The furnace 10 is likewise provided with the usual return duct 14 which is provided with an electrically operated circulation controlling means in the form of a fan or blower 15 driven by an electric motor 16.

The furnace 10 is herein shown as heated by a main gas burner 17 which is supplied with gas from a gas supply pipe 18. The gas supply pipe 18 is connected to a gas main 19 through two branches 20 and 21. The flow of gas through the branch 20 is controlled by a small capacity solenoid gas valve 22 which is provided with an operating winding 23. The flow of gas through branch 21 is controlled by a relatively high capacity gas valve 24, having a stem 25 which is normally biased to valve closed position by means of a coiled spring 26. An operating lever 27, which is pivoted at 28, is provided with a link 29 having a hooked end 30. This hooked end 30 of link 29 is adapted to be engaged by a crank pin 31 carried by a gear 32 which is rigidly connected to a motor rotor 33 through reduction gearing, generally indicated at 34. A field winding 35 is associated with the motor rotor 33. Upon energization of field winding 35, rotor 33 rotates gear 32 in a clockwise direction at a relatively low speed by reason of reduction gearing 34 and causes crank pin 31 to engage the hooked end 30 of link 29 whereupon valve stem 25 is lifted against the bias of spring 26 to move the high capacity valve 24 to open position. After the valve has been so moved to open position, the motor stalls and thereby maintains the valve in its full open position. Upon deenergization of field winding 35, the spring 26 closes the valve and rotates gear 32, reduction gearing 34 and motor rotor 33 in the reverse direction. After valve 24 has been closed, gear 32, reduction gearing 34 and the motor rotor 33 may continue rotating until their momentum is expended, since crank pin 31 only has a one way connection with the hooked end 30 of link 29. Such valves are well-known in the art and no claim thereto is made herein. The lever 27 also carries a mercury switch 36 which is moved to closed position upon lifting of lever 27 to open the valve 24. This mercury switch 36 is normally in open circuit position, as shown, when the valve 24 is closed and the lever 27 is in its lowermost position.

The high capacity valve 24 is herein shown as controlled by a thermostat 37 which preferably responds to the temperature of the rooms or space to be heated. This thermostat 37 comprises a coiled bimetallic actuating element 38 which controls a pair of switch arms 39 and 40. Upon temperature fall, the switch arm 39 first engages a contact 41 and upon continued fall in temperature, the switch arm 39 flexes, thereby allowing switch arm 40 to engage a contact 42. Upon a temperature rise, switch arm 40 first disengages contact 42 and thereafter switch arm 39 disengages contact 41. Such thermostats are now well-known in the art and the thermostat 37 may take the general form shown in Frederick S. Denison Patent No. 1,818,697 which issued August 11th, 1931.

The low capacity valve 22 is preferably controlled by switching means which respond to a heater condition and in the embodiment of the invention herein disclosed the low capacity valve 22 is shown as controlled by a switching mechanism 43 which responds to the temperature of the air heated by the warm air furnace 10. This switching mechanism 43 comprises the usual case 44 from which extends a tubular member 45. Secured to the extended end of tubular member 45 is one end of helically coiled thermostatic element 46, the other end of which is secured to and actuates a torsion rod 47 which in turn operates a mercury switch 48. The arrangement is such that mercury switch 48 is moved to closed circuit position upon a fall in the bonnet temperature to some minimum value such as 100° F. This switching mechanism 43 may take the general form shown in Charles P. Dougherty Patent No. 1,782,530 which issued November 25th, 1931.

The fan or blower motor 16 is controlled by a second bonnet temperature responsive switching mechanism, generally indicated at 50. This switching mechanism also comprises the usual case 51 from which a tubular member 52 extends. One end of a helically coiled bimetallic actuating element 53 is secured to the extended end of tubular member 52 and the other end thereof is secured to and operates a torsion rod 54. Torsion rod 54 controls a mercury switch 55, the arrangement being such that mercury switch 55 moves to closed circuit position upon a rise in bonnet temperature, and preferably at some higher bonnet temperature than the aforementioned minimum of 100° F., such, for instance, as 150° F. The switching mechanism 50 also preferably includes a second mercury switch 56 that is operated by torsion rod 54 and acts as a high limit control to prevent excessive bonnet temperatures. The mercury switch 56 is arranged to move to open circuit position if the bonnet temperature reaches some dangerously high value such as 300° F. The switching mechanism 50 may take the general form shown in John P. Kriechbaum Patent No. 1,951,663.

The burner 17 is preferably ignited by a pilot burner 60 which is connected to gas main 19 by means of a pilot supply pipe 61. A pilot switch comprising a bimetallic element 62 and a cooperating contact 63 is preferably associated with the pilot burner 60, the arrangement being such that bimetallic element 62 engages contact 63 only when pilot burner 60 is burning properly.

High voltage power is supplied by line wires 65 and 66. Low voltage power for field winding 35 of high capacity valve 24 is provided by a step down transformer 67, having a high voltage primary 68 connected to line wires 65 and 66, and a low voltage secondary 69. Similarly, low voltage power is supplied to low capacity valve 22 by means of a transformer 70, having a high voltage primary 71 connected to line wires 65 and 66, and a low voltage secondary 72. The remaining circuit connections will be described in detail under the heading "Operation".

The whole control system briefly above described has particular utility in that all of the devices used therein are standard commercial devices available on the market. Transformer 67, for instance, has only sufficient capacity to operate its associated high capacity valve 24 and transformer 70 has only sufficient capacity to operate its associated low capacity valve 22. One of the important features of the present invention is the provision of an automatic control system of the type heretofore pointed out in which all of the parts are commercially standard and readily obtainable upon the open market.

*Operation*

With the parts in the position shown, the pilot burner 60 is operating properly so that bimetallic element 62 is engaged with its cooperating contact 63. The room or space temperature is at or above the desired value as indicated by switch arms 39 and 40 being disengaged from their cooperating contacts 41 and 42. The bonnet temperature is somewhere between 100° F. and 150° F. since switches 48 and 55 are both in their open circuit position.

The bonnet temperature and the room or space temperature will both soon decrease but the probabilities are that the bonnet temperature will fall to the minimum of 100° F. before the room temperature falls sufficiently to move switch arms 39 and 40 into engagement with their respective contacts 41 and 42. Assuming the bonnet temperature does decrease to 100° F. before the room or space temperature responsive thermostat calls for heat, mercury switch 48 will be moved to closed circuit position whereupon operating winding 23 of low capacity valve 22 will be energized by the following circuit: secondary 72 of transformer 70, wire 73, wire 74, high limit switch 56, wire 75, contact 63, bimetallic element 62, wire 76, wire 77, operating winding 23, wire 78, switch 48 and wire 79 to the other side of secondary 72. Gas valve 22 will therefore be opened and a relatively small amount of gas will be supplied to burner 17 and ignited by pilot burner 60. The burning of this relatively small amount of fuel will slowly heat the air in the bonnet 11 of furnace 10 and some of this heat will be transmitted to the room or space by gravity circulation. When the bonnet temperature rises slightly above 100° F. the switch 48 will open and interrupt the aforementioned energizing circuit for operating winding 23, whereupon the low capacity valve 22 will reclose. In this manner, as long as the room or space temperature thermostat 37 remains satisfied, the low capacity valve 22 will be operated intermittently in response to changes in bonnet temperature to maintain the bonnet temperature above the predetermined minimum value. The heat thus generated by the furnace 10 will be supplied to the room or space to be heated by gravity circulation. When the outside weather conditions are relatively mild, the small amount of heat thus furnished to the room or space to be heated by the intermittent operation of low capacity valve 22 may be sufficient to maintain the room or space temperature at or above the desired value. In any event, this heat generated by the operation of low capacity valve 22 and which circulates to the room or space to be heated by gravity will serve to maintain a small continuous circulation of air in the space to be heated whereby the air therein will not become stratified, and the floor temperature will not become uncomfortable while the temperature at the higher level of the thermostat 37 is at or above the minimum desired values. Furthermore, by maintaining the bonnet temperature at or above a predetermined minimum, there is always some heat in the heater so that upon a call for heat by the space thermostat, less time will be required to raise the bonnet temperature to 150° F. at which temperature the circulating fan 15 is placed in operation. In this manner, the response of the heater to a call for heat by the space thermostat is speeded up by maintaining the heater warm at all times by the low capacity valve 22.

In the event the operation of low capacity valve 22 is not sufficient to maintain the room or space temperature at or above the desired value, switch arm 39 will first engage contact 41 and thereafter switch arm 40 will engage contact 42 to establish an energizing circuit for field winding 35 as follows: secondary 69 of transformer 67, wire 80, wire 74, high limit switch 56, wire 75, contact 63, bimetallic element 62, wire 76, wire 81, contact 41, switch arms 39 and 40, contact 42, wire 82, wire 83, field winding 35 and wire 84 to the other side of secondary 69. Energization of field winding 35 will open high capacity valve 24 and close mercury switch 36 as heretofore explained. Closure of mercury switch 36 establishes a holding circuit for field winding 35 which is independent of switch arm 40 and contact 42. This holding circuit is as follows: secondary 69 of transformer 67, wire 80, wire 74, high limit switch 56, wire 75, contact 63, bimetallic element 62, wire 76, wire 81, contact 41, switch arm 39, bimetallic element 38, wire 85, mercury switch 36, wire 86, wire 83, field winding 35 and wire 84 to the other side of secondary 69. A large amount of fuel will now be supplied to burner 17 and ignited by pilot burner 60. The bonnet temperature will therefore begin rising and this heat will be transmitted to the room or space by gravity circulation. In a short time the bonnet temperature will reach 150° F., since it is already at or above 100° F. by reason of the low capacity valve 22 and its controller, whereupon mercury switch 55 will be moved to closed circuit position and the fan or blower motor 16 will be energized as follows: line 65, wire 87, mercury switch 55, wire 88, motor 16, and wire 89 to line 66. Motor 16 will therefore drive fan or blower 15 and increase the circulation of heated air to the room or space. As the room or space temperature is restored, switch arm 40 will first disengage contact 42 and interrupt the initial energizing circuit for field winding 35 but this field winding 35 will remain energized by reason of the above described holding circuit. When the room temperature is completely restored, so as to move switch arm 39 from engagement with contact 41, the holding circuit will also be interrupted whereupon high capacity valve 24 will move to closed position and shut off the supply of gas to the burner 17. In the arrangement shown, blower motor 16 will remain energized even after closure of high capacity valve 24 and until the bonnet temperature has decreased below 150° F. Thereafter, the high and low capacity valves will again be controlled in accordance with changes in room or bonnet temperatures respectively as hereinabove described.

In the event the pilot burner 60 should become extinguished, bimetallic element 62 will disengage contact 63 and both the high and low capacity valves 24 and 22 will be rendered inoperative. Similarly, if the bonnet temperature should become excessive so as to move mercury switch 56 to open circuit position, both the high and low capacity valves 24 and 22 will be rendered inoperative. The low capacity valve 22 of course should be closed when the bonnet temperature rises to slightly over 100° F. but if the switching mechanism 43 should become inoperative for any reason, the high limit switch 56 would still prevent excessive bonnet temperatures by reason of operation of low capacity valve 22.

From the foregoing description, it will be seen that the present invention provides a simple system of automatic control composed entirely of standard parts readily available on the market by means of which a high capacity valve 24 is operated in accordance with changes in room or space temperature and a low capacity valve is operated in accordance with changes in the output of the heater, together with means for providing a forced circulation of heating fluid whenever the output of the heater is sufficiently high. As a result a closer temperature control is obtained. Furthermore, air stratification is eliminated and the heater is conditioned for a quick response upon a call for heat by the room or space thermostat.

It will be readily apparent that many changes and modifications can be readily made by those skilled in the art and it is therefore to be understood that I intend to be limited only by the scope of the appended claims.

I claim:

1. In a system of the class described, a heater for heating a circulating fluid, conducting means for permitting circulation of said circulating fluid for heating a space, a burner for heating said heater, means for supplying fuel to said burner, a pair of valve means of different fluid capacities controlling the supply of fuel, means responsive to heater temperatures to operate the smaller of said valve means to maintain said heater at a predetermined minimum temperature higher than the normal space temperature whereby gravity circulation of the circulating fluid through the conducting means is at all times provided to prevent stratification of the air in the space to be heated, and means responsive to space temperature to operate the larger of said valve means to increase the heater temperature when the space temperature falls below a predetermined value whereby said room is heated by said circulating fluid and the circulation thereof is increased.

2. In combination, a heater for heating a circulating medium, conducting means for permitting circulation of said circulating medium for heating a space, circulating means for causing forced circulation of said circulating medium through said conducting means, means responsive to heater temperature to maintain at all times a predetermined minimum heater temperature slightly higher than the normal space temperature whereby slow circulation of the circulating medium through the conducting means is caused to prevent cold sensations in the space to be heated, means responsive to space temperatures to increase the heater temperature when the space temperature falls below a predetermined value, and means responsive to heater temperatures to operate said circulating means when the heater temperature reaches a value above the predetermined minimum heater temperature whereby forced circulation of the circulating fluid through said conducting means is provided to heat said space.

3. In combination, a heater for heating a circulating medium, conducting means for permitting circulation of said circulating medium for heating a space, circulating means for causing forced circulation of said circulating medium through said conducting means, means responsive to heater temperatures to maintain at all times a predetermined minimum heater temperature slightly higher than the normal space temperature whereby slow circulation of the circulating medium through the conducting means is caused to prevent cold sensations in the space to be heated, means responsive to space temperatures to increase the heater temperature when the space temperature falls below a predetermined value, means responsive to heater temperatures to operate said circulating means when the heater temperature reaches a value above the predetermined minimum heater temperature whereby forced circulation of the circulating fluid through said conducting means is provided to heat said space, and means responsive to a predetermined high heater temperature for rendering said heater temperature controlling means inoperative but permitting operation of said circulating means.

4. In combination, a heater for heating a circulating medium, conducting means for permitting circulation of said circulating medium for heating a space, circulating means for causing forced circulation of said circulating medium through said conducting means, valve means for controlling the temperature of said heater, means responsive to heater temperatures to operate said valve means to maintain at all times a predetermined minimum heater temperature slightly higher than the normal space temperature whereby slow circulation of the circulating medium through the conducting means is caused to prevent cold sensations in the space to be heated, means responsive to space temperatures to operate said valve means to increase the heater temperature when the space temperature falls below a predetermined value, and means responsive to heater temperatures to operate said circulating means when the heater temperature reaches a value above the predetermined minimum heater temperature whereby forced circulation of the circulating fluid through said conducting means is provided to heat said space.

5. In combination, a heater for heating a circulating medium, conducting means for permitting circulation of said circulating medium for heating a space, circulating means for causing forced circulation of said circulating medium through said conducting means, valve means for controlling the temperature of said heater, means responsive to heater temperatures to operate said valve means to maintain at all times a predetermined minimum heater temperature slightly higher than the normal space temperature whereby slow circulation of the circulating medium through the conducting means is caused to prevent cold sensations in the space to be heated, means responsive to space temperatures to operate said valve means to increase the heater temperature when the space temperature falls below a predetermined value, means responsive to heater temperatures to operate said circulating means when the heater temperature reaches a value above the predetermined minimum heater temperature whereby forced circulation of the circulating fluid through said conducting means is provided to heat said space, and means responsive to a predetermined high heater temperature for rendering said valve means inoperative.

6. The combination with a heater and conducting means for permitting the circulation of heating fluid to a space to be heated, of circulating means for causing forced circulation of heating fluid through said conducting means, a pair of valves for controlling the temperature of said heater, means responsive to heater temperatures to operate one of said valves to maintain a predetermined minimum temperature higher than the normal space temperature whereby gravitational circulation of the heating fluid through the conducting means is provided to prevent cold sensations in the space to be heated, means responsive to space temperatures to operate the other of said valves to increase the heater temperature when the space temperature falls below a predetermined value, and means responsive to heater temperatures to operate said circulating means when the heater temperature reaches a predetermined value above the predetermined minimum heater temperature whereby forced circulation of the heating fluid through said conducting means is provided to heat said space.

7. The combination with a heater and conducting means for permitting the circulation of heating fluid to a space to be heated, of circulating means for causing forced circulation of heating fluid through said conducting means, a pair of valves for controlling the temperature of said heater, means responsive to heater temperatures to operate one of said valves to maintain a predetermined minimum temperature higher than the normal space temperature whereby gravitational circulation of the heating fluid through the conducting means is provided to prevent cold sensations in the space to be heated, means responsive to space temperatures to operate the other of said valves to increase the heater temperature when the space temperature falls below a predetermined value, means responsive to heater temperatures to operate said circulating means when the heater temperature reaches a predetermined value above the predetermined minimum heater temperature whereby forced circulation of the heating fluid through said conducting means is provided to heat said space, and means responsive to a predetermined maximum heater temperature to close said valves to prevent overheating of said heater.

8. In combination, a gas fired heater for heating a fluid medium, an electrically operated circulator for circulating said fluid medium, a pair of electrically operated valves in control of the flow of gas to said heater, first and second switches, means responsive to a heater condition, connections between said means and said first switch for closing the same when the heater condition falls to a predetermined minimum, connections between said means and second switch for closing the same when the heater condition rises to a predetermined value, a gas pilot for said heater, a pilot switch which is closed when said pilot is burning, a circuit for one of said valves controlled by said first switch and pilot switch, a circuit for said circulator including said second switch, a room thermostat, and a circuit for the other of said valves controlled by said room thermostat and pilot switch.

9. In combination, a heater for heating a circulating fluid, an electrically operated circulator, a pair of electrically operated fuel valves, a first switch responsive to the temperature of the fluid medium and closed when the temperature thereof is below a given minimum, a second switch responsive to the temperature of the fluid medium and closed when the temperature thereof is above a second minimum higher than said first minimum, a circuit for one of said valves controlled by said first switch, a circuit for said circulator controlled by said second switch, a room thermostat, and a circuit for the other of said valves controlled by said room thermostat.

10. In combination, a heater for heating a circulating medium, a high voltage electrically operated circulator, a pair of low voltage electrically operated fuel valves, a source of high voltage power, a pair of step-down transformers each having only sufficient capacity to operate one of said fuel valves, a first switch responsive to the temperature of said circulating medium which closes when the value thereof is below a predetermined minimum, a second switch responsive to the temperature of said circulating medium which closes when the value thereof is above said minimum, a circuit for said circulator including said source of high voltage power and said second switch, a circuit for one of said valves including one of said transformers and said first switch, a room thermostat, and a circuit for the other of said valves including the other of said transformers and said room thermostat.

11. In combination, a heater for heating a circulating fluid, a circulator for circulating the fluid, a pair of fuel valves, a first control means responsive to the temperature of the fluid medium, a second control means responsive to the temperature of the fluid medium, means connecting the first control means and one of said valves to open said valve when the temperature of the fluid medium falls below a predetermined minimum, means connecting the second control means and the circulator for operating the circulator when the temperature of the fluid medium rises above a predetermined value, a room thermostat, and means connecting the room thermostat and the other of the valves for opening said valve when the room temperature falls below a predetermined value.

JOHN P. KRIECHBAUM.